(12) United States Patent
Eggerding et al.

(10) Patent No.: US 7,573,698 B2
(45) Date of Patent: *Aug. 11, 2009

(54) WINDOW VIA CAPACITORS

(75) Inventors: Carl L. Eggerding, Murrells Inlet, SC (US); Jason MacNeal, Danville, KY (US); John L. Galvagni, Surfside Beach, SC (US); Andrew P. Ritter, Surfside Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 316 days.

This patent is subject to a terminal disclaimer.

(21) Appl. No.: 11/517,536

(22) Filed: Sep. 7, 2006

(65) Prior Publication Data

US 2007/0035911 A1 Feb. 15, 2007

Related U.S. Application Data

(63) Continuation-in-part of application No. 11/338,037, filed on Jan. 23, 2006, now Pat. No. 7,170,737, which is a continuation of application No. 10/674,906, filed on Sep. 30, 2003, now Pat. No. 7,016,175.

(60) Provisional application No. 60/415,831, filed on Oct. 3, 2002.

(51) Int. Cl.
*H01G 4/228* (2006.01)
*H01G 4/06* (2006.01)

(52) U.S. Cl. .................................... 361/306.3; 361/311

(58) Field of Classification Search ............. 361/306.3, 361/301.4, 303–305, 306.2, 307, 308.1, 308.2, 361/308.3, 309–311
See application file for complete search history.

(56) References Cited

U.S. PATENT DOCUMENTS

| 3,612,963 | A | 10/1971 | Piper et al. |
| 4,439,813 | A | 3/1984 | Dougherty et al. |
| 4,831,494 | A | 5/1989 | Arnold et al. |
| 5,504,277 | A | 4/1996 | Danner |
| 5,517,385 | A | 5/1996 | Galvagni et al. |
| 5,637,832 | A | 6/1997 | Danner |
| 5,661,450 | A | 8/1997 | Davidson |
| 5,799,379 | A | 9/1998 | Galvagni et al. |
| 5,880,925 | A | 3/1999 | DuPre et al. |

(Continued)

FOREIGN PATENT DOCUMENTS

EP 1115129 A2 7/2001

*Primary Examiner*—Eric Thomas
(74) *Attorney, Agent, or Firm*—Dority & Manning, P.A.

(57) ABSTRACT

A method of forming a window via capacitor comprises a first step of providing a plurality of interleaved dielectric layers and paired electrode layers to create a multilayered arrangement characterized by top and bottom surfaces and a plurality pf side surfaces. First and second transition layer electrode portions are provided on a top surface of the multilayered arrangement on top of which a cover layer formed to define openings, or windows, therein is provided. The cover layer may be provided before device firing or may be printed on after firing using polymer or glass. Peripheral terminations are subsequently formed on the device periphery to connect selected electrode layers to respective transition layer electrode portions. Via terminations are formed in the cover layer openings, on top of which solder balls may be applied. Some of the terminations may be formed in accordance with various plating techniques as disclosed.

17 Claims, 10 Drawing Sheets

U.S. PATENT DOCUMENTS

| | | |
|---|---|---|
| 6,034,864 A | 3/2000 | Naito et al. |
| 6,038,121 A | 3/2000 | Naito et al. |
| 6,092,269 A * | 7/2000 | Yializis et al. ............ 29/25.42 |
| 6,226,170 B1 | 5/2001 | Nellissen et al. |
| 6,243,253 B1 | 6/2001 | DuPre et al. |
| 6,324,048 B1 | 11/2001 | Liu |
| 6,370,011 B1 | 4/2002 | Naito et al. |
| 6,407,907 B1 | 6/2002 | Ahiko et al. |
| 6,459,561 B1 | 10/2002 | Galvagni et al. |
| 6,462,933 B2 | 10/2002 | Takeshima et al. |
| 6,496,355 B1 | 12/2002 | Galvagni et al. |
| 6,519,132 B1 | 2/2003 | Liu |
| 6,519,134 B1 | 2/2003 | Li et al. |
| 6,587,327 B1 | 7/2003 | Devoe et al. |
| 6,594,136 B2 | 7/2003 | Kuroda et al. |
| 6,606,237 B1 | 8/2003 | Naito et al. |
| 6,757,152 B2 | 6/2004 | Galvagni et al. |
| 7,016,175 B2 | 3/2006 | MacNeal et al. |
| 7,170,737 B2 * | 1/2007 | MacNeal et al. ......... 361/306.3 |

* cited by examiner

US 7,573,698 B2

WINDOW VIA CAPACITORS

PRIORITY CLAIM

This application is a Continuation-in-part (CIP) of U.S. patent application Ser. No. 11/338,037 filed Jan. 23, 2006 which issued on Jan. 30, 2007 as U.S. Pat. No. 7,170,737, which is a continuation of U.S. patent application Ser. No. 10/674,906 filed Sep. 30, 2003 which issued on Mar. 21, 2006 as U.S. Pat. No. 7,016,175, and which claims benefit of previously filed U.S. Provisional Application No. 60/415,831 filed Oct. 3, 2002, entitled "WINDOW VIA CAPACITOR", all of the foregoing of which are fully incorporated herein by reference for all purposes.

BACKGROUND OF THE INVENTION

The present subject matter generally concerns improved termination features for multilayer electronic components, and more particularly relates to via connections for multilayer capacitors. Specific formation and arrangement of internal electrode layers with an optional window termination layer facilitates the formation of low-inductance terminations. Such terminations are preferably compatible with ball grid array (BGA) and other device mounting technologies.

Many modern electronic components are packaged as monolithic devices, and may comprise a single component or multiple components within a single chip package. One specific example of such a monolithic device is a multilayer capacitor or capacitor array, and of particular interest with respect to the disclosed technology are multilayer capacitors with interdigitated internal electrode layers and corresponding electrode tabs. Examples of multilayer capacitors that include features of interdigitated capacitor (IDC) technology can be found in U.S. Pat. No. 5,880,925 (DuPré et al.) and U.S. Pat. No. 6,243,253 B1 (DuPré et al.). Other monolithic electronic components correspond to devices that integrate multiple passive components into a single chip structure. Such an integrated passive component may provide a selected combination of resistors, capacitors, inductors and/or other passive components that are formed in a multilayered configuration and packaged as a monolithic electronic device.

Selective terminations are often required to form electrical connections for various monolithic electronic components. Multiple terminations are needed to provide electrical connections to the different electronic components of an integrated monolithic device. Multiple terminations are also often used in conjunction with IDC's and other multilayer arrays in order to reduce undesirable inductance levels. One exemplary way that multiple terminations have been formed in multilayer components is by drilling vias through selected areas of a chip structure and filling the vias with conductive material such that an electrical connection is formed among selected electrode portions of the device.

Yet another way that terminations have been formed for multilayer electronic devices involves coating portions of termination lands with a solder stop material, thus forming a predefined area to which a solder ball or other solder preform may be applied.

Termination features for monolithic electronic components may also be designed such that small components are adapted for mounting to a relatively larger circuit board environment, such as in U.S. Pat. No. 6,324,048 B1 (Liu). Such is especially true for capacitor devices, with which it is often preferred to have very small devices positioned in a very specific location on a printed circuit board or other substrate. Thus, particular arrangement of internal and external component features may yield additional advancements in component configuration and termination. The disclosures of all of the foregoing mentioned patents are hereby incorporated by reference for all purposes.

While various aspects and alternative features are known in the field of capacitor formation and terminations therefor, no one design has emerged that generally addresses all of the issues as discussed herein.

BRIEF SUMMARY OF THE INVENTION

The present subject matter recognizes and addresses various of the foregoing and other aspects of capacitor formation, component termination, and related technology. Thus, broadly speaking, a principal object of the presently disclosed technology is improved formation of and termination features for electronic components, and especially for multilayer capacitive devices.

Another object of the presently disclosed technology is to provide a multilayer capacitor with internal electrode layers that are formed in an interdigitated fashion thus yielding an electrode configuration characterized by generally low equivalent series inductance (ESL). It has been found that the inductance of a capacitor is dominated by the inductance of the first layer, so in the exemplary configurations presented in accordance with the present subject matter, the overall inductance of the capacitor is reduced by the very efficient structure as disclosed.

Yet another object of the present subject matter is to provide capacitor components that are compatible with Ball Grid Array (BGA) mounting technology, thus providing multiple coplanar contacts on the underneath of a monolithic chip device.

A still further object of the present technology is to provide a multilayer device with a top cover layer having windows formed therein such that contacts can be directly plated to an internal electrode layer surface of the multilayer device. A transition layer may also be utilized such that all termination contacts can be made to a single layer within the multilayer device.

Yet another object of the present subject matter is to provide an improved multilayer capacitor and corresponding termination features that include an ability to put controlled equivalent series resistance (ESR) in a circuit environment with which the multilayer capacitor is used.

Additional objects and advantages of the present subject matter are set forth in or will be apparent to those of ordinary skill in the art from the detailed description herein. Also, it should be further appreciated by those of ordinary skill in the art that modifications and variations to the specifically illustrated, referenced, and discussed features hereof may be practiced in various embodiments and uses of the disclosed technology without departing from the spirit and scope thereof, by virtue of present reference thereto. Such variations may include, but are not limited to, substitution of equivalent means and features, materials, or steps for those shown, referenced, or discussed, and the functional, operational, or positional reversal of various parts, steps, features, or the like.

Still further, it is to be understood that different embodiments, as well as different presently preferred embodiments, of the disclosed technology may include various combinations or configurations of presently disclosed features, steps or elements, or their equivalents (including combinations of features or steps or configurations thereof not expressly shown in the figures or stated in the detailed description).

One exemplary embodiment of the presently disclosed technology corresponds to a multilayer electronic device formed from a plurality of dielectric layers interleaved with a plurality of paired electrode layers to form a multilayered arrangement. First and second transition layer electrode portions are provided on a top surface of the multilayered arrangement, on top of which a glass or polymer cover layer is provided. The cover layer is formed to provide a plurality of openings therethrough to expose portions of the first and second transition layer electrode portions. First and second peripheral terminations are formed along selected side surfaces of the capacitor's multilayered arrangement and electrically connect selected electrode layers to respective first and second transition layer electrode portions.

In related embodiments, additional via terminations are formed in the openings defined by the cover layer, and solder balls may also be connected to the via terminations to facilitate component compatibility with ball grid array (BGA) mounting techniques. The via terminations, which may be multilayered terminations in some embodiments, can be formed by a variety of plating techniques.

Still further exemplary embodiments of the present subject matter concern corresponding methodology for forming multilayered electronic devices. In one embodiment of such methodology, a plurality of dielectric and paired electrode layers are provided in a stacked arrangement, on top of which at least one respective first and second transition layer electrode portions are provided. A cover layer formed to define openings therein (i.e., windows) for exposing portions of the transition layer electrode portions may be applied before the device is fired, or may alternatively be printed on using polymer, glass or other suitable material after the device has been fired. First and second peripheral terminations formed on side surfaces of the stacked multilayer arrangement as well as via terminations formed in the cover layer openings may then be provided on the fired device. Some of the various terminations may be formed with plating technologies, such as immersion in an electroless plating solution, and may selectively include more than one layer of successively plated material. Solder balls may also be applied to the via terminations formed in the cover layer openings.

Additional embodiments of the present subject matter, not necessarily expressed in this summarized section, may include and incorporate various combinations of aspects of features, parts or steps referenced in the summarized objectives above, and/or features, parts or steps as otherwise discussed in this application.

Those of ordinary skill in the art will better appreciate the features and aspects of such embodiments, and others, upon review of the remainder of the specification.

BRIEF DESCRIPTION OF THE SEVERAL VIEWS OF THE DRAWING

A full and enabling description of the present subject matter, including the best mode thereof, directed to one of ordinary skill in the art, is set forth in the specification, which makes reference to the appended figures, in which.

Figure 1A:
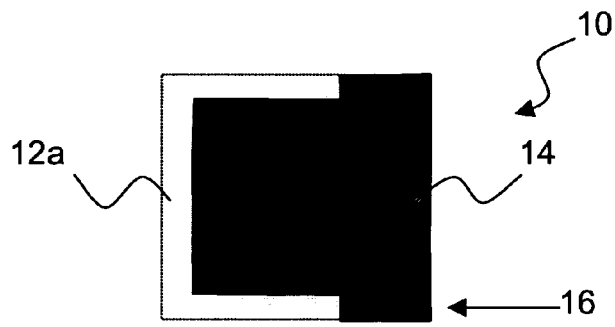
FIGS. 1A through 1E respectively illustrate generally top views of exemplary successive layers for utilization in a first exemplary window via capacitor embodiment in accordance with the present subject matter.

Repeat use of reference characters throughout the present specification and appended drawings is intended to represent same or analogous features, elements, or steps of the present technology.

DETAILED DESCRIPTION OF THE PREFERRED EMBODIMENTS

As referenced in the Brief Summary of the Invention section, the present subject matter is directed towards improved component formation and termination features for multilayer capacitors and other electronic components.

The subject "window via capacitors" utilize at least one cover layer with window-like openings that expose portions of internal electrode layers or optional transition layers such that electrical contacts can be directly plated to such exposed areas. It is desired to form a plurality of co-planar terminations such that solder balls may be applied in accordance with BGA mounting techniques.

Several exemplary embodiments of the subject window via capacitor technology are presented herein to relay significant aspects of the present subject matter. FIGS. 1A through 5, respectively, illustrate aspects of a first exemplary window via capacitor embodiment of the present technology, including first and second variations thereof. FIGS. 6A through 7, respectively, depict a second exemplary window via capacitor embodiment of the present technology as well as related aspects thereof. A third exemplary embodiment of the present subject matter is presented with respect to FIGS. 8A through 9B, respectively. Each of the respective exemplary embodiments presented herein may be selectively formed in accordance with the exemplary process steps discussed with respect to FIG. 10.

It should be noted that each of the exemplary embodiments as presented herein should not insinuate limitations of the disclosed technology. Features or steps illustrated or described as part of one embodiment can be used in combination with another embodiment to yield further embodiments. Additionally, certain features or steps may be interchanged with similar devices, processes or features not mentioned yet which perform the same, similar or equivalent function.

Furthermore, some of the capacitors are shown with terminals only on a selected top or bottom surface of the multilayer component. Some applications may prefer or even require that the component be symmetrical with respect to top and bottom surfaces, so that they can be assembled using automated equipment or to permit electrical feed-through connections. In such cases, the construction described forming selected top surfaces can also be used for selected bottom surfaces, as represented in exemplary embodiment 40b of FIGS. 2B and 4B.

Reference will now be made in detail to the presently preferred embodiments of the disclosed technology. Referring to the drawings, FIGS. 1A through 1E illustrate generally top views of exemplary successive layers for utilization in a first exemplary window via capacitor 40 (such as represented in the exploded views of FIGS. 2A and 2B.) A first layer 10 as represented in FIG. 1A comprises a sheet of dielectric material 12a which is partially covered by a first electrode plate 14. Electrode plate 14 may be formed such that a portion of the electrode plate extends to and along at least one entire edge 16 of dielectric sheet 12b. When a plurality of layers are successively stacked on top of one another, portions of the electrode plates will thus be exposed at selected side portions of the multilayer device.

Figure 1B:
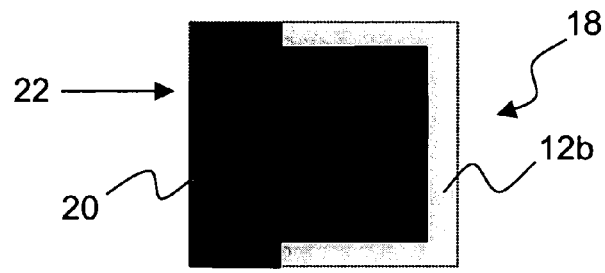

A second layer 18 that may be utilized in forming a first exemplary window via capacitor is illustrated in FIG. 1B, and is similar to the first layer 10 of FIG. 1A. Second layer 18 preferably comprises a sheet of dielectric material 12b which is partially covered by a second electrode plate 20. Electrode plate 20 may be formed such that a portion of the electrode plate extends to and along at least one entire edge 22 of dielectric sheet 12b. The portion of electrode plate 20 exposed at edge 22 and any adjacent exposed portions preferably opposes the portion of electrode plate 10 formed by edge 16. As will be further discussed with reference to FIGS. 2A and 2B, first layer 10 and second layer 18 can be provided adjacent to one another in a layered stack such that electrode plates 14 and 20 respectively form the opposing active plates of a parallel-plate capacitor.

A transition layer is also preferably employed in a first exemplary embodiment of the subject window via capacitor technology. Two exemplary transition layers 24a and 24b are respectively illustrated in FIGS. 1C and 1D. Either transition layer embodiment may be utilized in the window via capacitor embodiments in accordance with the present subject matter. As such, discussion herein with regards to a transition layer 24 concerns both such exemplary transition layers 24a and 24b. Also, when the figures and/or discussed embodiments include a transition layer 24, either exemplary transition layer 24a or 24b or some other variation thereof may be utilized. The same such situation holds for reference number 26, corresponding to portions 26a and/or 26b, and reference number 28, corresponding to portions 28a and/or 28b.

Figures 1C, 1D:
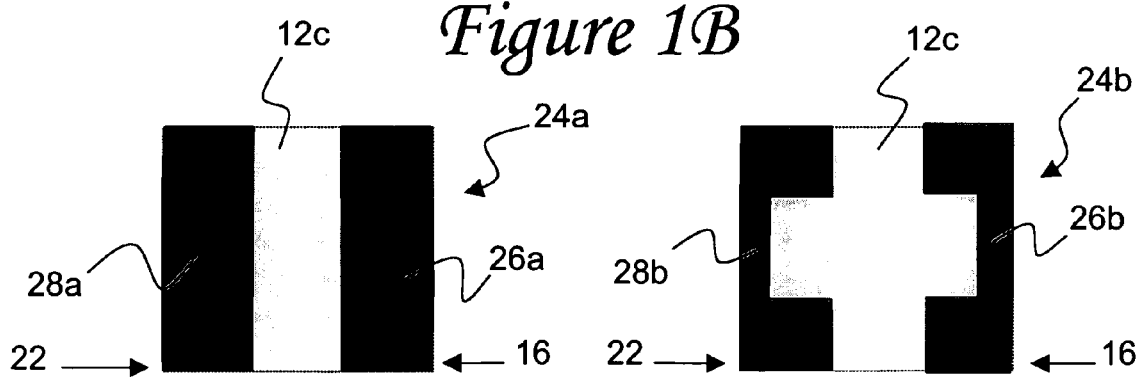

Transition layers 24a and 24b, top views of which are respectively depicted in FIGS. 1C and 1D, comprise a sheet of dielectric material 12c on top of which is provided a first transition layer electrode portion 26 and a second transition layer electrode portion 28. First transition layer electrode portion 26 preferably extends to the same selected edge 16 to which electrode plate 14 of FIG. 1A extends, and transition layer electrode portion 28 preferably extends to the same selected edge 22 to which electrode plate 20 of FIG. 1B extends. Transition layer electrode portions may be generally rectangular in shape such as portions 26a and 28a of FIG. 1C, or may be have a generally U-shaped configuration, such as portions 26b and 28b of FIG. 1D.

It should be appreciated that the formation of the electrode plates 14 and 20 and the transition layer 24 with electrode portions 26 and 28, as well as the location of exposed portions thereof, may be along one or many edges. Modifications to the disclosed electrode plates and portions is within the spirit and scope of the present technology as long as a selected plurality of the electrode portions remain exposed at a first aligned peripheral location and an additional selected plurality of the electrode portions remain exposed at least one other different peripheral location.

Figure 1E:
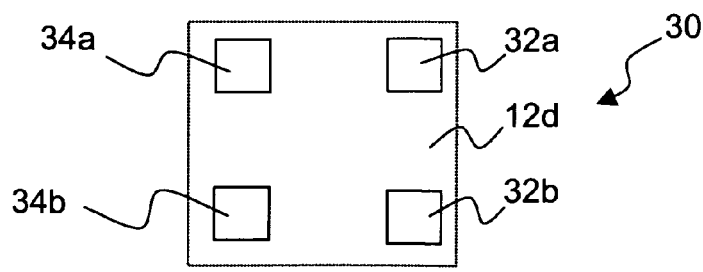

FIG. 1E displays an exemplary cover layer 30 for use in a first exemplary window via capacitor embodiment of the present subject matter. Cover layer 30 comprises a sheet 12d of dielectric material that is formed to define a first plurality of windows 32a and 32b (hereafter collectively referred to as 32) as well as a second plurality of windows 34a and 34b (hereafter collectively referred to as 34.) In some embodiments of the present technology, cover layer 30 is characterized by an exemplary thickness of about one mil. Such windows 32 and 34 are utilized to form window via terminations in accordance with the present subject matter, as will be further appreciated with respect to the remaining discussion.

Dielectric sheets 12a-12d, may respectively comprise any type of semiconductive or ceramic material suitable for use in capacitive or other types of electronic components, including barium titanate, zinc oxide, alumina with low-fire glass, or other suitable ceramic or glass-bonded materials. In some embodiments of the present technology, dielectric sheets 12a-12d may have thickness in a range of about five to about twenty-five microns. Electrode plates 14 and 20 as well as transition layer electrode portions 26 and 28 may comprise any conductive material suitable for use as an electrode plate, such as platinum, gold, nickel, niobium, palladium, ruthenium, iridium, ruthenium oxide, iridium oxide, other suitable conductive materials, or a combination or alloy of selected of the above-referenced substances. By employing a material with resistive properties, such as ruthenium oxide, in electrode plates and/or electrode portions of the present technology, then controlled equivalent series resistance (ESR) may be introduced into the subject window via capacitors.

Figure 2A:
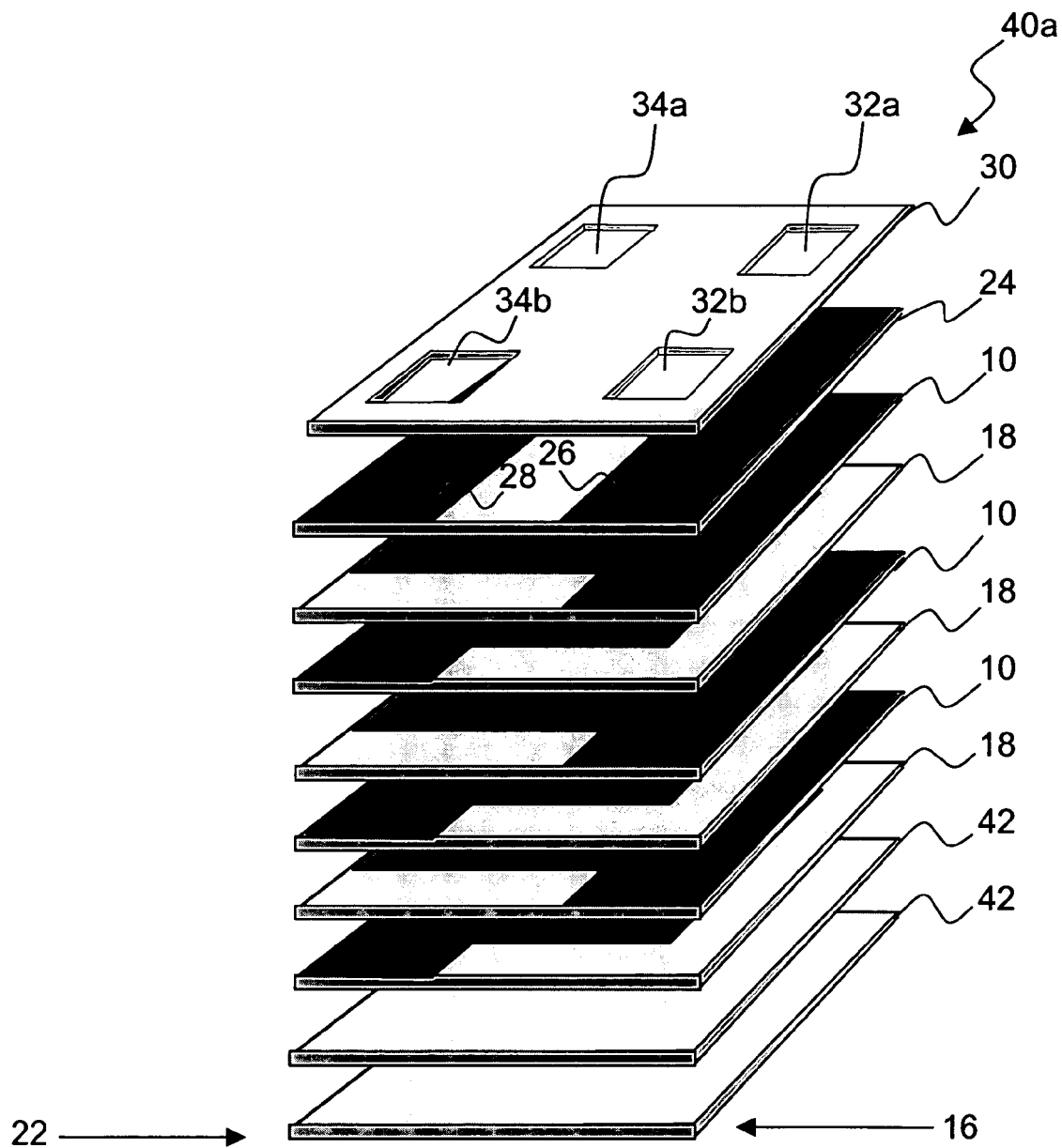
FIG. 2A provides a generally side exploded view with slight top perspective of a first variation of a first exemplary window via capacitor embodiment with layers such as those illustrated in FIGS. 1A through 1E respectively.
Figure 2B:
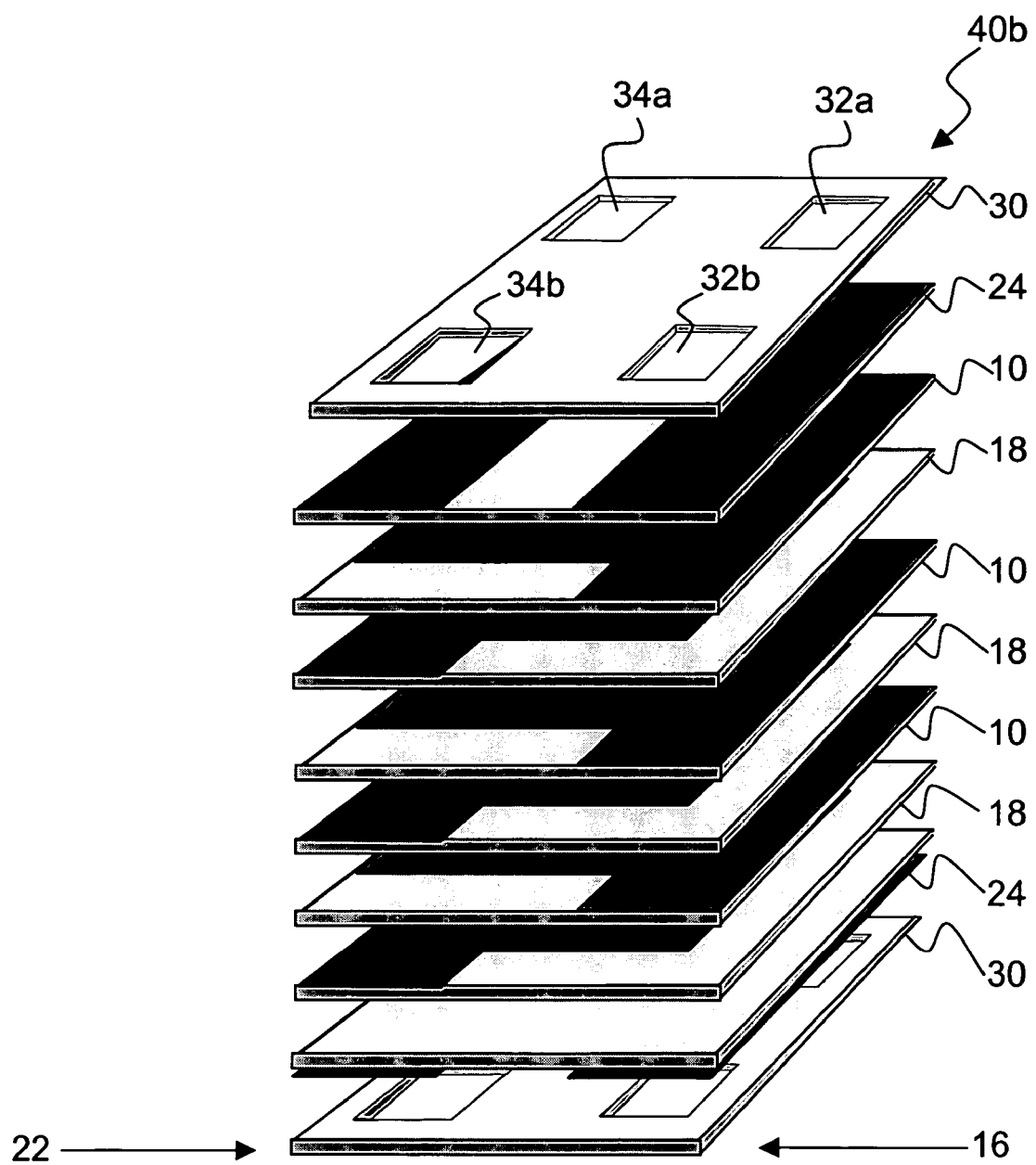
FIG. 2B provides a generally side exploded view with slight top perspective of a second variation of a first exemplary window via capacitor embodiment with layers such as those illustrated in FIGS. 1A through 1E respectively.

The layers illustrated in FIGS. 1A through 1E respectively, may be combined together to form a first exemplary window via capacitor embodiment of the subject technology (variations of which are respectively illustrated in FIGS. 2A and 2B.) Such window via capacitor is a multilayer structure discussed herein with regards to layers being successively stacked in a particular order and/or relationship from bottom to top. It should be appreciated that such bottom and top reference is used merely for the sake of convenience. The bottom layers may actually be the top layers when such capacitor is mounted to a circuit board.

Referring to the exemplary window via capacitor 40*a* of FIG. 2A, the bottom layers may comprise at least one (two are shown in FIG. 2A) sheet 42 of dielectric material. Sheets 42 may be similar to the dielectric sheets 12*a*-12*c*, and may comprise similarly selected materials. Such bottom layers are provided to add support to the multilayered structure of first exemplary embodiment 40*a* and protection for the other layers and active components thereof. After providing bottom layers 42, at least one first layer 10 and at least one second layer 18 are provided. Such first and second layers are preferably provided in an alternating fashion and in corresponding pairs such that the electrode plates of a given first layer 10 and an adjacent second layer 18 form opposing capacitor plates. It should be appreciated that three first layers 10 and three second layers 18 are illustrated in FIG. 2A for exemplary purposes only and that any number of first and second layers 10 and 18 may be provided in accordance with the present technology. After providing first and second layers 10 and 18, a transition layer 24 and a cover layer 30 are respectively added to the stacked configuration of embodiment 40*a*.

FIG. 2B illustrates another exemplary window via capacitor embodiment 40*b*, which may be similar to FIG. 2A except for the bottommost layers of the device. As previously mentioned, some applications require that a component be symmetrical with respect to top and bottom surfaces. As such, the bottom layers of FIG. 2B preferably comprise a transition layer 24 and cover layer 30 (similar to the top two layers.) It should be noted that for symmetry, the bottom transition layer 24 is stacked in a reverse orientation to the top transition layer 24. In this way, the bottom layers are actually the same as the top layers, but reversed, so that after termination it does not matter which side the user positions down for whatever purpose or purposes, such as mounting, testing, or plating.

Figure 3:
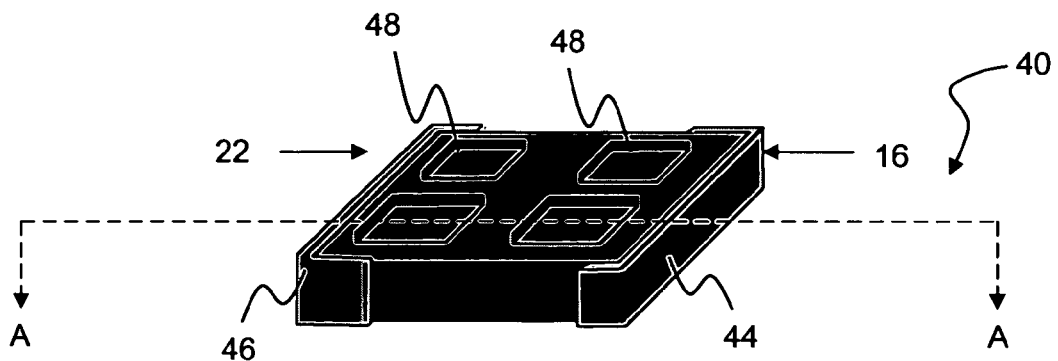
FIG. 3 provides a generally side view with slight top perspective of a first exemplary window via capacitor embodiment in accordance with the present subject matter.

Once the selected layers for a window via capacitor are stacked and fired together, terminations to the internal electrode plates and transition layer electrode portions may be effected. First capacitor embodiments 40*a* and 40*b* (referred to in FIG. 3 as embodiment 40, and with a detailed view of a portion of first exemplary capacitor 40 represented in FIG. 5) may be terminated on the ends as shown in FIG. 3 to connect all electrodes of a first polarity together and similarly to connect all electrodes of the opposing polarity together. Peripheral termination 44 is preferably connected to the exposed portions of electrode plates 14 and first transition layer electrode portion(s) 26. Such first peripheral termination 44 extends across the entire side 16 of the capacitor 40 and may wrap around to selected parts of the adjacent sides of the device. Peripheral termination 46 is preferably connected to the exposed portions of electrode plates 20 and second transition layer portion(s) 28. Such second peripheral termination 46 extends across the entire side 22 of the capacitor 40 and wraps around to selected parts of the adjacent sides of the device.

Peripheral terminations 44 and 46 may be formed by application of a "thick-film" conductive termination material, such as silver or copper paste. Peripheral terminations 44 and 46 may alternatively be formed by effecting deposition of a conductive material to selected exposed electrode portions and ultimately forming "plated terminations." Such plated terminations may be formed by electroplating or electrochemical deposition, wherein capacitor 40 with exposed electrode portions is subjected to a plating solution such as electrolytic nickel or electrolytic tin characterized by an electrical bias. The capacitor itself is then biased to a polarity opposite that of the plating solution, and conductive elements in the plating solution are attracted to selected of the exposed electrode portions of the capacitor. Such a plating technique with no polar biasing is referred to as electroless plating, and can be employed in conjunction with electroless plating solutions such as nickel or copper ionic solution.

In accordance with electrochemical deposition and electroless plating techniques, capacitor 40 is preferably submersed in an appropriate plating solution for a particular amount of time. With certain embodiments of the present subject matter, no longer than fifteen minutes is required for enough plating material to deposit at selected exposed electrode portions along a window via capacitor such that buildup is enough to spread the plating material to create a continuous connection among selected adjacent exposed electrode portions.

Another technique that may be utilized in accordance with the formation of plated terminations involves magnetic attraction of plating material. For instance, nickel particles suspended in a bath solution can be attracted to selected similarly conductive exposed electrode portions of a capacitor by taking advantage of the magnetic properties of nickel. Other materials with similar magnetic properties may be employed in the formation of plated terminations.

A still further technique regarding the application of plated termination material to selected exposed electrode portions of a window via capacitor involves the principles of electrophoretics or electrostatics. In accordance with such exemplary technology, a bath solution contains electrostatically charged particles. A window via capacitor with exposed electrode portions may then be biased with an opposite charge and subjected to the bath solution such that the charged particles are deposited at select locations on the component. This technique is particularly useful in the application of glass and other semiconductive or nonconductive materials. Once such materials are deposited, it is possible to thereafter convert the deposited materials to conductive materials by intermediate application of excessive heat to the component.

One particular methodology for forming plated terminations in accordance with the disclosed technology relates to a combination of the above-referenced plating application techniques. A window via capacitor may first be submersed in an electroless plating solution, such as copper ionic solution, to deposit an initial layer of copper over selected exposed electrode portions. The plating technique may then be switched to an electrochemical plating system which allows for a faster buildup of copper on the selected portions of such component.

In accordance with the different available techniques for plating material to selected exposed electrode portions of a window via capacitor in accordance with the present technology, different types of materials may be used to create the plated terminations. For instance, metallic conductors such as nickel, copper, tin, etc. may be utilized as well as suitable resistive conductors or semi-conductive materials (such as are provided in accordance with varistor technology), and/or combinations of selected of these different types of materials.

Plated terminations in accordance with the present subject matter are guided by the position of exposed electrode portions. Such phenomena may be referred to as "self-determining" since the formation of plated terminations is determined by the configuration of exposed metallization at selected peripheral locations on the window via capacitor. Further assurance of complete plating coverage and bonding of the plated materials may be achieved by including resistance-reducing additives in the plating solution(s). A still further mechanism for enhancing the adhesion of metallic deposit that forms the plated terminations is to thereafter heat the component in accordance with such technologies as baking, laser subjection, UV exposure, microwave exposure, arc welding, etc.

The connection of peripheral terminations 44 and 46 to electrode portions of a transition layer collect the two opposing terminations onto a single planar surface. Electrical connection to all active portions of capacitor 40 can thus be effected through connection to the respective electrode portions of one or more transition layer(s). Referring to FIGS. 2A and 2B, the first plurality of windows 32 provides exposed access to the first transition layer electrode portion(s) 26 and the second plurality of windows 34 provides exposed access to the second transition layer electrode portion(s) 28. Although only two windows are illustrated in each of respective pluralities 32 and 34, it should be appreciated that a greater or fewer number of windows may be provided to expose the electrode portions of transition layer 24. The windows may also be relocated to suit a particular set of contacts on the substrate to which the part will be mounted.

Windows 32 and 34 defined in cover layer 30 may also be thought of as ceramic solder dams in which window vias 48 may be formed. A detailed view of a portion of first exemplary capacitor 40 is represented in FIG. 5, which illustrates the window 32a formed in cover layer 30. It should be appreciated that the following discussion with respect to window 32a may be equally applicable to other windows and window vias of the present technology. An exemplary thickness 50 for cover layer 30 is about thirty-five microns, while an exemplary width 52 for window 32a is about one-hundred-twenty-five microns.)

Still referring to FIG. 5, a window via may be formed in window 32a (and in other windows) to provide termination to the exposed portion of electrode portion 26 of transition layer 24. Window via 48 may comprise a single termination layer or multiple termination layers, each of which may be characterized by a variety of material compositions and/or specified thickness. One particular example of a window via 48 includes a first plated layer 54 of copper, a second plated layer 56 of nickel and a third plated layer 58 of tin. Another example of a window via 48 includes a first plated metallic layer, a second plated layer of resistor-polymeric material, and a third additional metallic layer, for example made of tin or copper. Yet another example of a window via 48 includes a first plated metallic layer and a second plated layer of a resistive alloy.

Such plated multilayer window vias may be formed in accordance with the "plated termination" technology previously addressed with respect to first and second peripheral terminations 44 and 46. It should be appreciated that any variety of materials may be employed in the formation of window vias 48, while still remaining within the spirit and scope of the present subject matter. It should be further appreciated that aspects of the specific exemplary multi-layered window via configurations and materials used therein, as discussed in the preceding paragraph, may also be utilized in some embodiments of peripheral terminations 44 and 46.

Figure 4A:
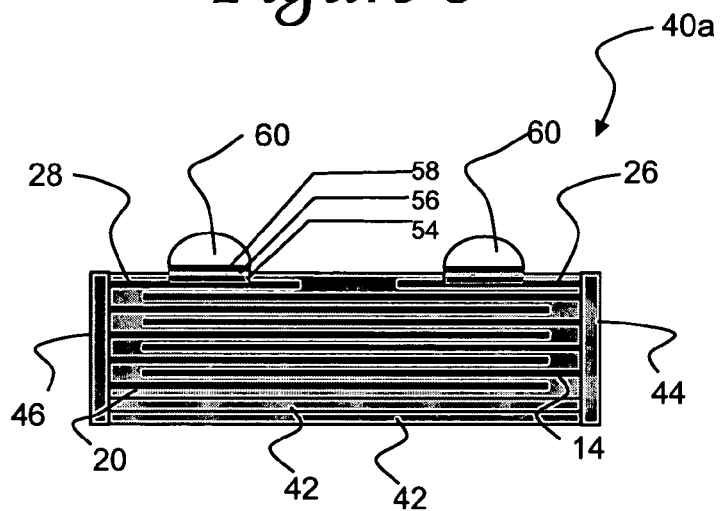
FIGS. 4A and 4B provide a generally side cross-sectional views of respective first and second variations of a first exemplary window via capacitor embodiment, such as taken along cut line A-A of FIG. 3, with the further addition of specific exemplary mounting features (in this instance, solder balls) in accordance with the present subject matter.
Figure 4B:
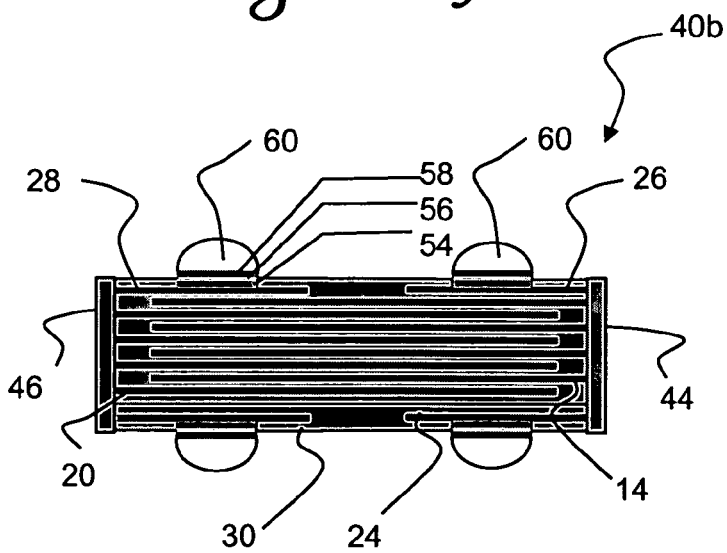
Figure 5:
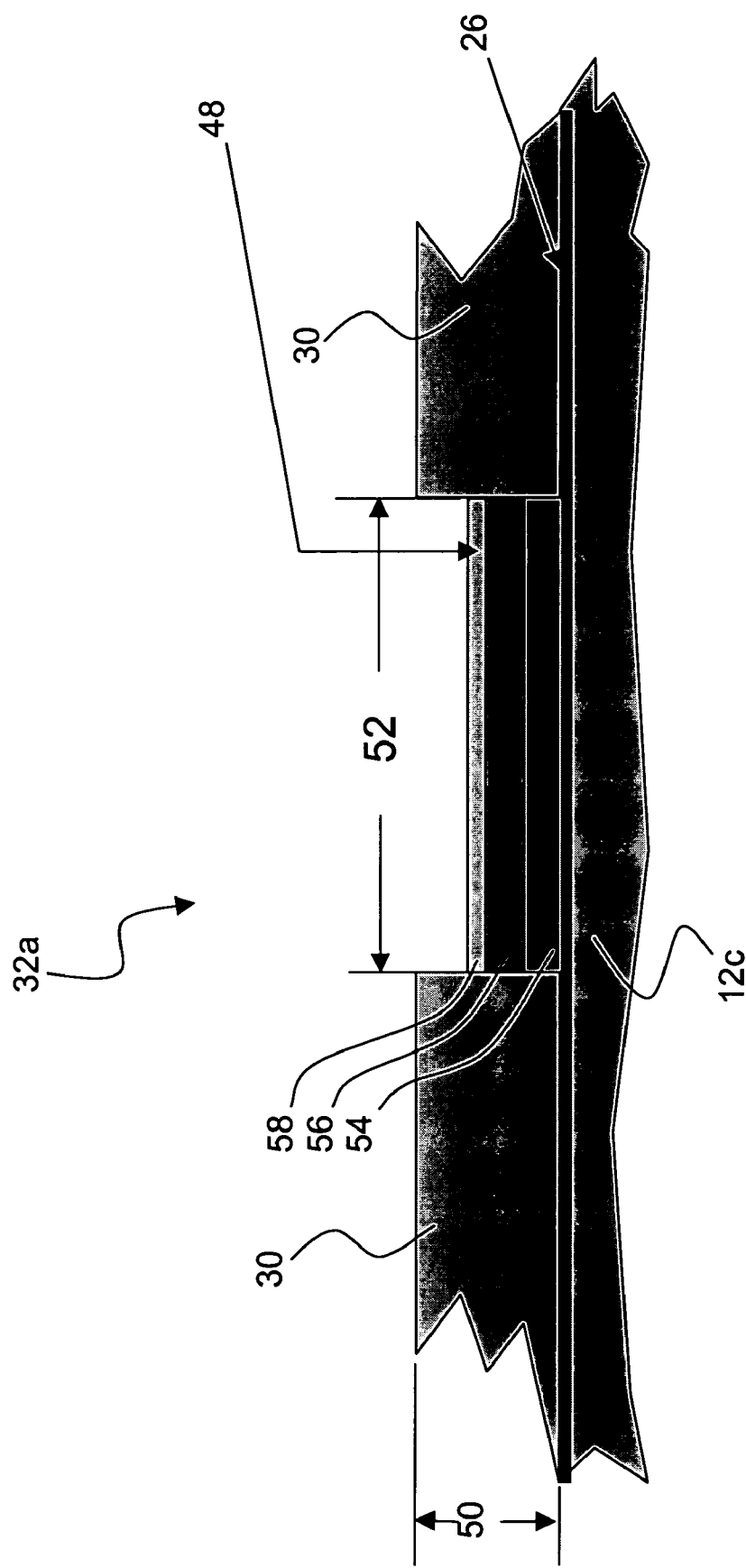
FIG. 5 provides an enlarged, generally side cross-sectional view of an exemplary window via in accordance with an exemplary window via capacitor of the present subject matter.
Figure 6A:
FIGS. 6A through 6E respectively illustrate generally top views of exemplary successive layers for utilization in a second exemplary window via capacitor embodiment in accordance with the present subject matter.

FIGS. 4A and 4B provide cross-sectional views of respective variations of first exemplary window via capacitor 40 as taken along cut line A-A in FIG. 3, with the addition of exemplary window vias as presented in FIG. 5 and with the further addition of solder balls in accordance with the present technology. FIG. 4a illustrates additional aspects of the layered configuration presented with respect to embodiment 40a of FIG. 2A, while FIG. 4b illustrates additional aspects of the layered configuration presented with respect to embodiment 40b of FIG. 2B. Solder balls 60, for example a C4 solder bump, may be placed on the respective contact areas formed by plated tin layers 58 (or other upper window via surfaces) formed in cover layers 30. Solder balls 60 may then be reflowed to give a Ball Grid Array (BGA) contact formation.

Figure 6B:
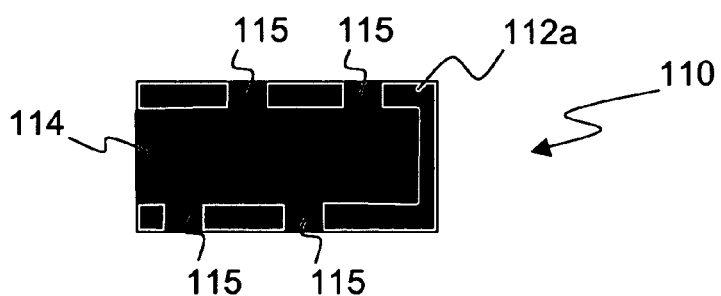
Figure 6C:
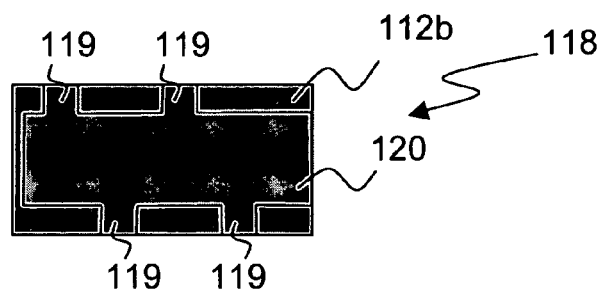
Figure 6D:
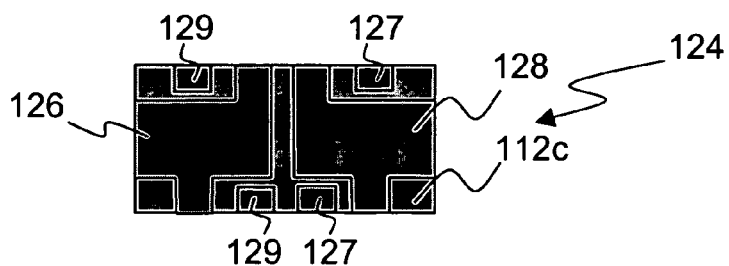
Figure 6E:
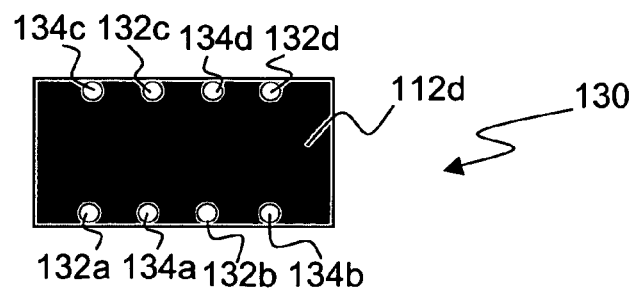
Figure 7A:
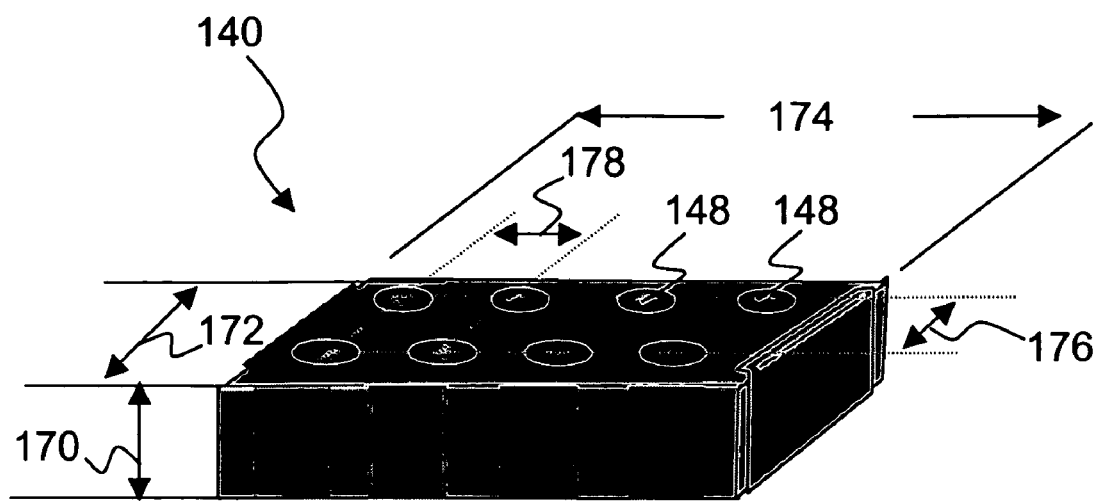
FIG. 7A provides a generally side view with slight top perspective of a second exemplary window via capacitor embodiment in accordance with the present subject matter.
Figure 7B:
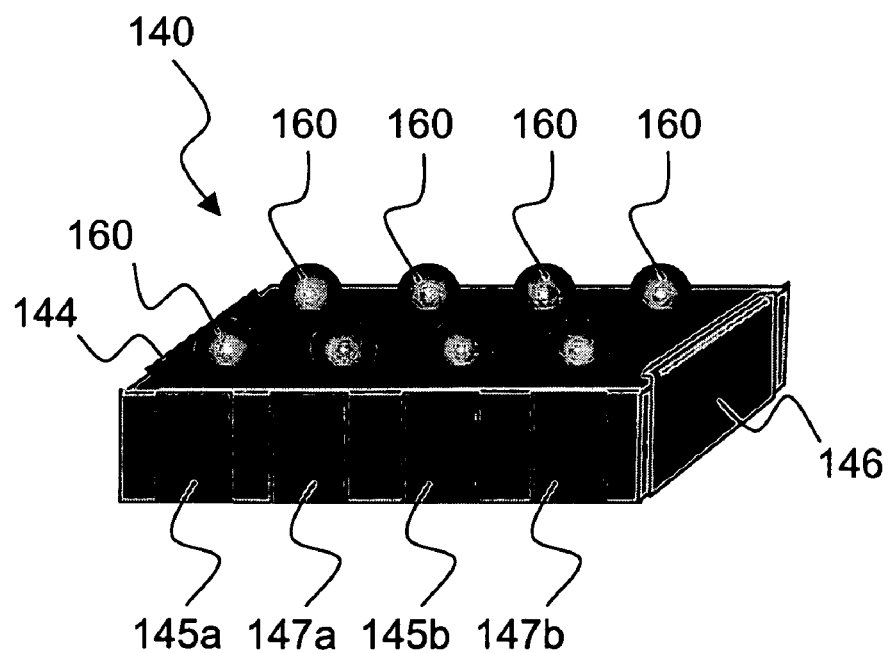
FIG. 7B provides a generally side view of a second exemplary window via capacitor embodiment with specific exemplary mounting features (in this instance, solder balls) in accordance with the present subject matter.

FIGS. 6A through 6E respectively illustrate generally top views of exemplary successive layers for utilization in a second exemplary window via capacitor 140, such as shown in FIGS. 7A and 7B. Since elements presented with respect to such second exemplary embodiment 140 are similar to elements presented with respect to the first exemplary embodiment 40, similar reference numbers but in a "100" series are used to indicate such similar elements. For instance, an element in first embodiment 40 having reference number 20 would have a reference number 120 to depict a similar element in such different embodiment. Aspects of the present subject matter addressed with respect to first exemplary embodiment 40 may be equally applicable to second exemplary embodiment 140.

As such, FIG. 6A illustrates an exemplary bottom layer 142, which comprises a sheet of dielectric material. FIG. 6B illustrates an exemplary first layer 110 corresponding to a sheet 112a of dielectric material partially covered by a first electrode plate 114. Portions of first electrode plate 114 preferably extend to selected edges of dielectric sheet 112a. Electrode plate 114 may comprise a main portion with electrode tabs 115 that extend from the main portion to selected edges of dielectric sheet 112a. FIG. 6C illustrates an exemplary second layer 118 comprising a sheet 112b of dielectric material partially covered by a second electrode plate 120. Portions of second electrode plate 120 preferably extend to selected edges of dielectric sheet 112b at differently aligned locations than where portions of first electrode plate 114 extends. Electrode plate 120 may comprise a main portion with electrode tabs 119 that extend from the main portion to selected edges of dielectric sheet 112b.

Still referring to a second exemplary window via capacitor embodiment 140 of the present subject matter, FIG. 6D illustrates an exemplary transition layer 124 which comprises a sheet 112c of dielectric material partially covered by transition layer electrode portions. A first transition layer electrode portion 126 and plurality of first anchor tab portions 127 are preferably aligned in the same location as portions of first electrode plate 114 and tabs 115 thereof. By exposing such first electrode plate 114 and tabs 115 at the same location along edges of the first layer 110 as where the first transition layer electrode portion 126 and first plurality of anchor tabs 127 are exposed along edges of transition layer 124, peripheral terminations can be used to connect a plurality of such layers together. Similarly, a second transition layer electrode portion 128 and plurality of second anchor tab portions 129 are preferably aligned in the same location as portions of second electrode plate 120 and tabs 119 thereof. By exposing such second electrode plate 120 and tabs 119 at the same location along edges of the second layer 118 as where the second transition layer electrode portion 128 and second plurality of anchor tabs 129 are exposed along edges of transition layer 124, peripheral terminations can be used to connect a plurality of these such layers together. In some embodiments of the present technology, anchor tabs 127 and 129 may respectively be about 10 mils long and about 15 mils wide.

FIG. 6E provides an exemplary cover layer 130 for use in second exemplary window via capacitor embodiment 140 of the present subject matter. Cover layer 130 comprises a sheet 112d of dielectric material that is formed to define a first plurality of windows 132a through 132d respectively (hereafter collectively referred to as 132) as well as a second plurality of windows 134a through 134d respectively (hereafter collectively referred to as 134.) The first plurality of windows 132 provides exposed access to the first transition layer electrode portion 126 and plurality of first anchor tabs 127. The second plurality of windows 134 provides exposed access to the second transition layer electrode portion 128 and plurality of second anchor tabs 129. Although only four windows are illustrated in the respective pluralities 132 and 134, it should be appreciated that a greater or fewer number of windows may be provided to expose the electrode portions of transition layer 124.

The respective layers illustrated in FIGS. 6A through 6E are to be layered in a determined stacked configuration, just as the circumstances for the exploded stacks depicted in FIGS. 2A and 2B. At least one bottom layer 142, a plurality of alternating first layers 110 and second layers 118, a transition layer 124 and a cover layer 130 may be stacked together to form second exemplary embodiment 140 of FIGS. 7A and 7B. The electrode plates 114 and 120 of each adjacent pair of layers 110 and 118 form opposing active capacitor plates. Instead of bottom layers 142, another transition layer 124 and cover layer 130 may be utilized to form a more symmetrical component. After forming and firing such a stacked configuration, terminations to the internal electrode plates and transition layer electrode portions and anchor tabs may be effected.

Second capacitor embodiment 140 may be terminated on selected sides of the multilayer device as shown in FIGS. 7A and 7B to connect all electrodes of a first polarity together and similarly to connect all electrodes of the opposing polarity together. Peripheral termination 144 preferably connects selected exposed portions of electrode plates 114 to first transition layer electrode portion 126. Peripheral terminations 145*a* and 145*b*, as well as two other peripheral terminations on the opposing side of capacitor 140 (not shown in FIG. 7B), preferably connect additional exposed portions of electrode plates 114 (namely electrode tabs 115) to transition layer anchor tabs 127. Peripheral termination 146 preferably connects selected exposed portions of electrode plates 120 to second transition layer electrode portion 128. Peripheral terminations 147*a* and 147*b*, as well as two other peripheral terminations on the opposing side of capacitor 140 (not shown in FIG. 7B), preferably connect additional exposed portions of electrode plates 120 (namely electrode tabs 119) to transition layer anchor tabs 129. Peripheral terminations 144 and 146 may be used for electrical test, thus simplifying the test process. Further, they can also provide simple contact to the exposed electrode surfaces in the windows, so they can be electroplated.

Referring still to FIGS. 7A and 7B, the connection of peripheral terminations 144, 146, 145*a*, 145*b*, 147*a* and 147*b* to the electrode portions of transition layer 124 collect the two opposing terminations onto a single planar surface. Electrical connection to all active portions of capacitor 140 can thus be effected through connection to the respective electrode portions of transition layer 124. Such electrical connections may be effected by window vias 148 formed in windows 132 and 134. As previously discussed, window vias formed in accordance with the present technology may be formed with any combination of materials and with any specified thickness. Window vias 148 may generally correspond to a solderable round pad to which solder balls 160 may be placed and reflowed. Solder balls 160 thus provide electrical connection to all active portions of window via capacitor 140 while terminating capacitor 140 with BGA mounting features.

Exemplary dimensions for the second exemplary window via capacitor embodiment 140 of the present technology are represented in FIG. 7A. In some embodiments, capacitor 140 may be characterized by a thickness 170 of about forty mils (0.040 inches), a width 172 of about eighty mils (0.080 inches) and a length 174 of about one-hundred-twenty mils (0.120 inches). An exemplary width pitch 176 between adjacent window vias 148 may be about sixty mils and an exemplary length pitch 178 between adjacent window vias 148 may be about thirty mils.

Figure 8A:
FIGS. 8A through 8E respectively illustrate generally top views of exemplary successive layers for utilization in a third exemplary window via capacitor embodiment in accordance with the present subject matter.
Figure 8B:
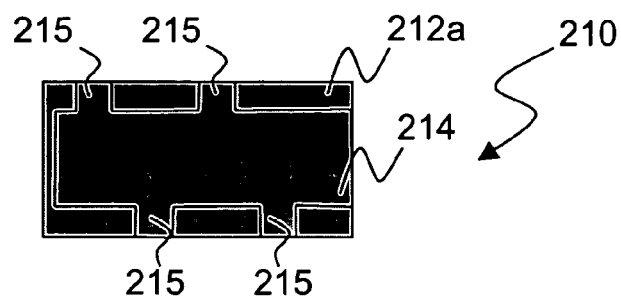
Figure 8C:
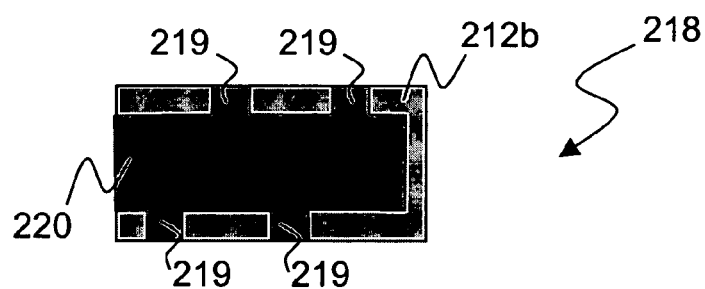
Figure 8D:
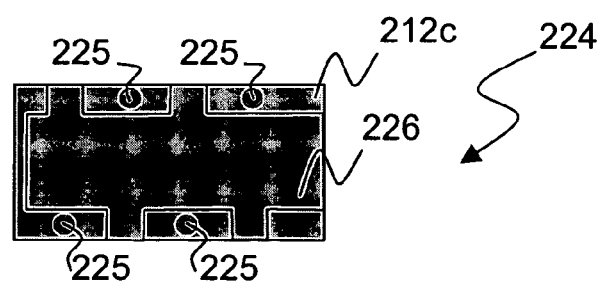
Figure 8E:
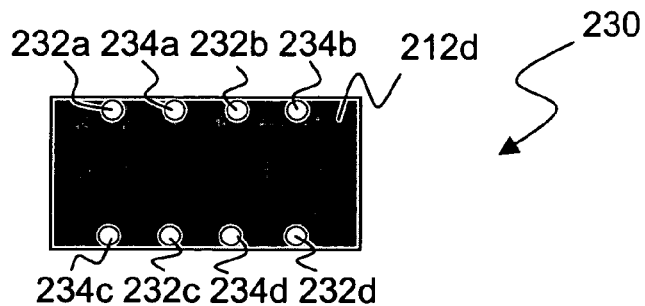
Figure 9A:
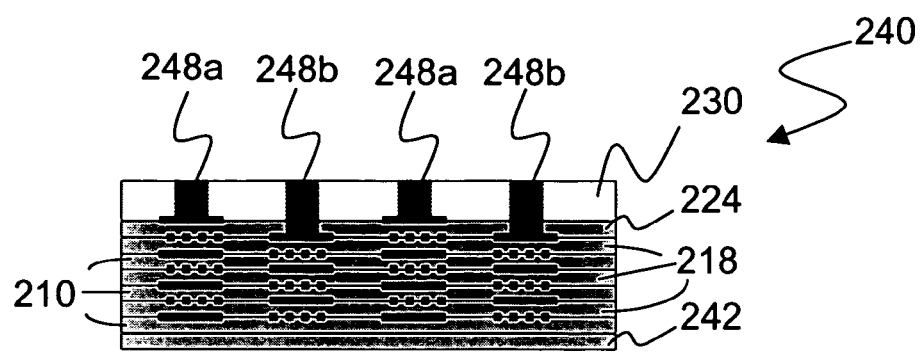
FIG. 9A provides a generally side view of a third exemplary window via capacitor embodiment in accordance with the present subject matter.
Figure 9B:
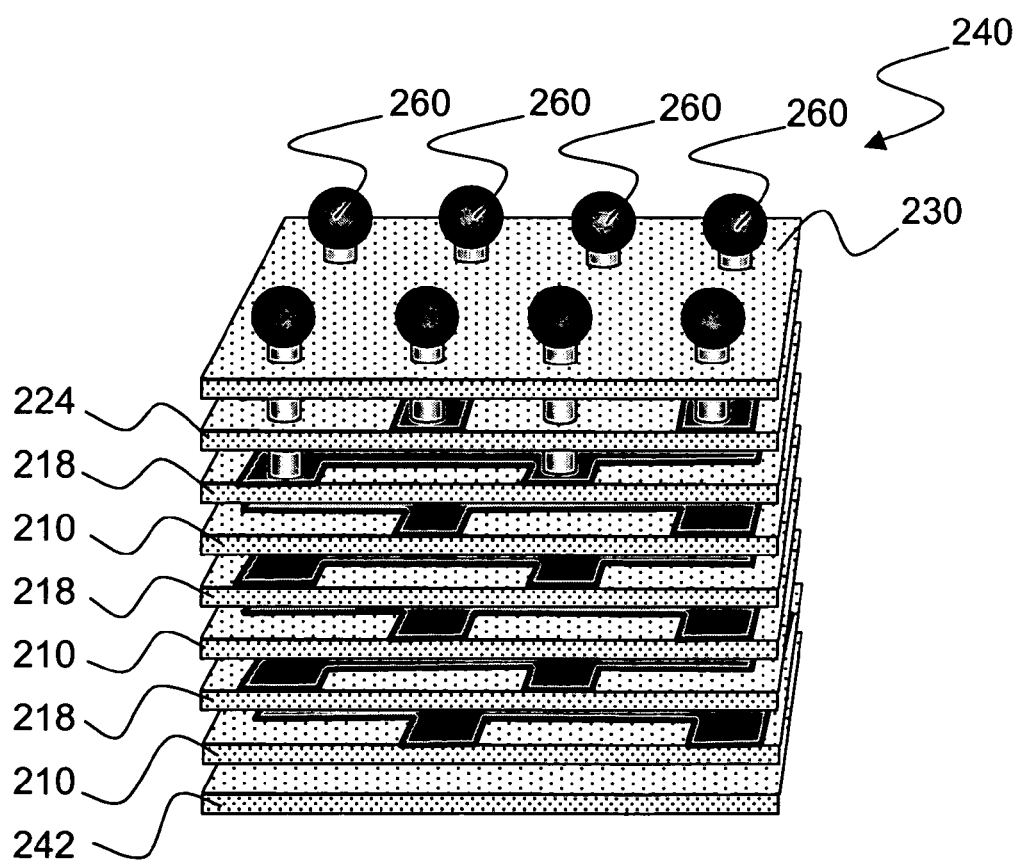
FIG. 9B provides a generally side exploded view with slight top perspective of a third exemplary window via capacitor embodiment with specific exemplary mounting features (in this instance, solder balls) in accordance with the present subject matter.

FIGS. 8A through 8E respectively illustrate generally top views of exemplary successive layers for utilization in a third exemplary window via capacitor 240, such as shown in FIGS. 9A and 9B. Since elements presented with respect to such third exemplary embodiment 240 are similar to elements presented with respect to the first exemplary embodiment 40 and second exemplary embodiment 140, similar reference numbers but in a "200" series are used to indicate such similar elements. For instance, an element in first embodiment 40 having reference number 20 would have a reference number 220 to depict a similar element in such third exemplary embodiment. Aspects of the present subject matter addressed with respect to first exemplary embodiment 40 and/or with respect to second exemplary embodiment 140 may be equally applicable to third exemplary embodiment 240.

As such, FIG. 8A illustrates an exemplary bottom layer 242, which comprises a sheet of dielectric material. FIG. 8B illustrates an exemplary first layer 210 corresponding to a sheet 212*a* of dielectric material partially covered by a first electrode plate 214. Portions of first electrode plate 214 preferably extend to selected edges of dielectric sheet 212*a*. Electrode plate 214 may comprise a main portion with electrode tabs 215 that extend from the main portion to selected edges of dielectric sheet 212*a*. FIG. 8C illustrates an exemplary second layer 218 comprising a sheet 212*b* of dielectric material partially covered by a second electrode plate 220. Portions of second electrode plate 220 preferably extend to selected edges of dielectric sheet 212*b* at differently aligned locations than where portions of first electrode plate 214 extends. Electrode plate 220 may comprise a main portion with electrode tabs 219 that extend from the main portion to selected edges of dielectric sheet 212*b*.

Still referring to a third exemplary window via capacitor embodiment of the present subject matter, FIG. 8D illustrates an exemplary transition layer 224 which comprises a sheet 212*c* of dielectric material partially covered by transition layer electrode portions. A first transition layer electrode portion 226 may be generally similar in shape to the first electrode plate 214. By exposing each first electrode plate 214 and tabs 215 at the same location along edges of the first layer 210 as where the first transition layer electrode portion 226 are exposed along edges of transition layer 224, peripheral terminations can be used to connect a plurality of such layers together.

With further reference to the exemplary transition layer 224 of FIG. 8D, the dielectric sheet 212*c* may be formed to define a plurality of transition layer windows (or conductive vias) 225 which may expose (or serve to electrically connect) portions of an underlying electrode plate 220 of second layer 218.

FIG. 8E provides an exemplary cover layer 230 for use in second exemplary window via capacitor embodiment 240 of the present subject matter. Cover layer 230 comprises a sheet 212*d* of dielectric material that is formed to define a first plurality of windows 232*a* through 232*d* respectively (hereafter collectively referred to as 232) as well as a second plurality of windows 234*a* through 234*d* respectively (hereafter collectively referred to as 234.) The first plurality of windows 232 provides exposed access to the first transition layer electrode portion 226. The second plurality of windows 234 in conjunction with windows 225 of transition layer 224 provide exposed access to the top second electrode plate 220 of top second layer 218. Although only four windows are illustrated in the respective pluralities 225, 232 and 234, it should be appreciated that a greater or fewer number of windows may be provided to expose the electrode portions of transition layer 224 and second layer 218. Further, these windows can be adjusted to fit the particular pattern of the substrate to which the part will be mounted.

The respective layers illustrated in FIGS. 8A through 8E are to be layered in a determined stacked configuration, an example of which is depicted in FIGS. 9A and 9B. At least one bottom layer 242, a plurality of alternating first layers 210 and second layers 218, a transition layer 224 and a cover layer 230 may be stacked together to form third exemplary embodiment 240 of FIGS. 9A and 9B. The electrode plates 214 and 220 of each adjacent pair of layers 210 and 218 form opposing active capacitor plates. Such first and second layers are preferably arranged with an equal number of each and such that a second layer 218 is provided on top, such that subsequent provision of a transition layer 224 and a cover layer 230 exposes appropriate electrode portions for making electrical connection thereto.

Although not shown, it should be appreciated that instead of a bottom layer 242, another transition layer 224 and cover layer 230 may be utilized to form a more symmetrical component (such as in exemplary embodiment 40b), than that depicted in FIG. 9B.

After forming and firing a stacked configuration of the layers depicted in FIGS. 8A through 8E respectively, terminations to the internal electrode plates and transition layer electrode portion may be effected. Third capacitor embodiment 240 may be terminated on selected sides of the multilayer device with peripheral terminations (not shown) that connect all electrodes of a first polarity together and similarly connect all electrodes of the opposing polarity together. Window vias may then provide additional termination features for capacitor 240. Although selected such window vias in accordance with third exemplary embodiment 240 may extend through windows in two layers, the resultant capacitor 240 is characterized by an relatively low inductance terminations and lower overall ESL.

Referring still to FIGS. 9A and 9B, electrical connection to all active portions of capacitor 240 can thus be effected through connection to the respective electrode portions of transition layer 224 and top second layer 218. Such electrical connections may be effected by window vias 248a and 248b. Window vias 248a preferably extend through windows 232 to transition layer electrode portion 226, while window vias 248b preferably extend through windows 234 and underlying windows 225 to top second electrode plate 220. As previously discussed, window vias formed in accordance with the present technology may be formed with any combination of materials and with any specified thickness. As depicted in FIG. 9B, solder balls 260 may then be reflowed to selected ends of vias 248a and 248b thus providing electrical connection to all active portions of window via capacitor 240 while terminating capacitor 240 with BGA mounting features.

It should be appreciated that the above discussion of exemplary window via capacitor embodiments includes reference to certain aspects of making and forming such embodiments. Specific details and related aspects of such methodology will not be elaborated on with reference to FIG. 10. The steps illustrated and discussed with respect to FIG. 10 may be used in conjunction with the production aspects already discussed.

Figure 10:
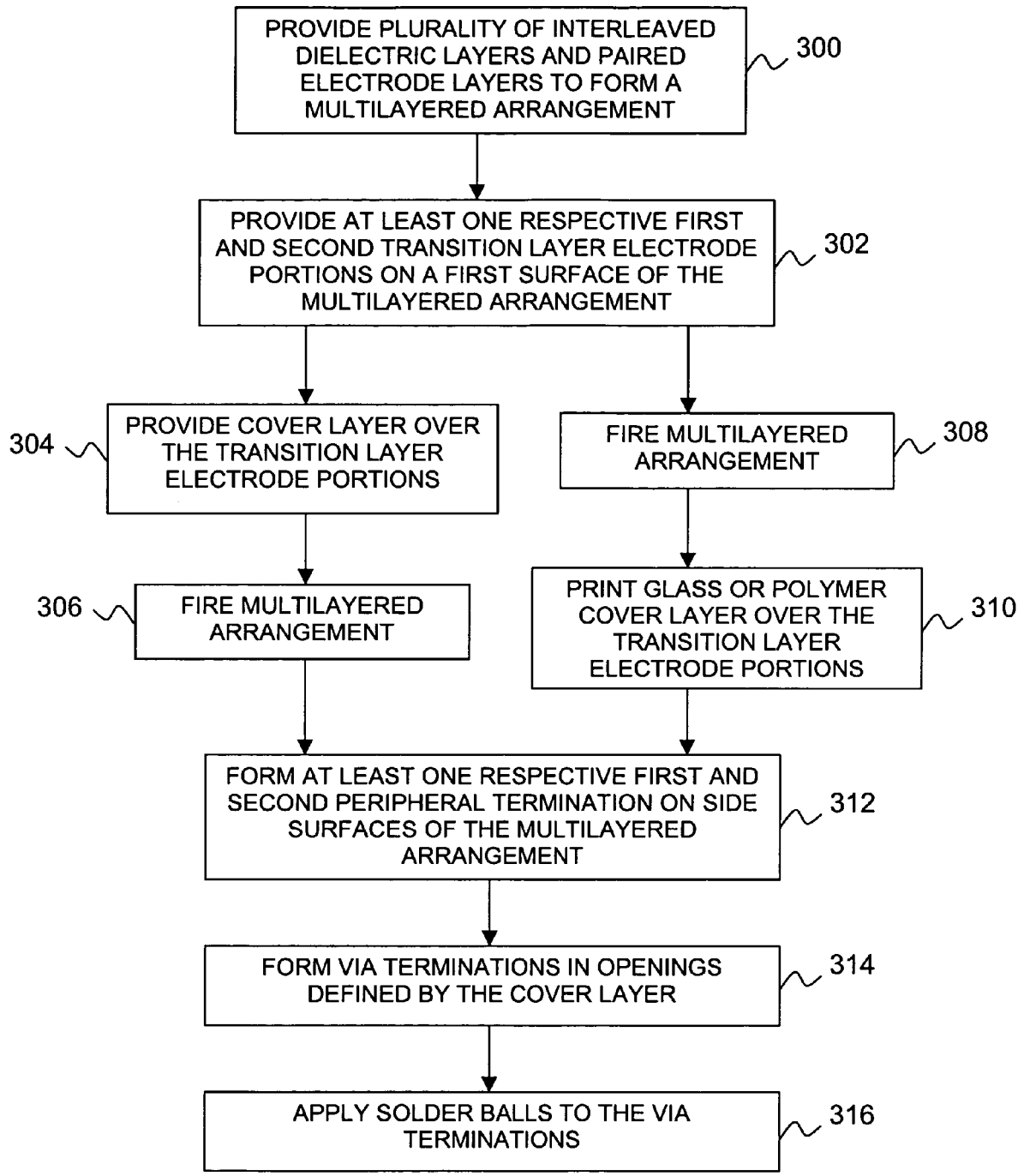
FIG. 10 provides a block diagram of exemplary steps for forming a window via capacitor in accordance with aspects of the present subject matter.

Referring now to FIG. 10, a first exemplary step 300 in a process of forming a multilayer electronic device, such as a window via capacitor of the present subject matter, corresponds to providing a plurality of dielectric and electrode layers in a stacked multilayer arrangement. As previously described, first and second electrode layers may be interleaved among dielectric layers and provided in paired combination to form respective opposing plates of a parallel-plate capacitor. The multilayered arrangement is preferably characterized by first and second opposing surfaces (corresponding to top and bottom surfaces of the stack) and a plurality of side surfaces. A portion of each electrode layer preferably extends to and is exposed on at least one side surface of the multilayered arrangement. In some embodiments, multiple dielectric layers are provided at one end of the stacked arrangement to add support to the multilayered structure, such as represented by layers 42 in FIG. 2A. In step 302, at least one respective first and second transition layer electrode portions are provided on a first surface of the stacked multilayer arrangement of dielectric and electrode layers. At the end of step 302, the electrode and dielectric layers have not yet been fired and are generally referred to as being in a "green" state.

Proceeding with exemplary process steps in accordance with the present subject matter, it will be appreciated that certain alternatives may be realized. In one exemplary embodiment, a green sheet of dielectric material is provided in step 304 on top of the transition layer electrode portions to form a cover layer defining a plurality of openings (i.e., windows) therein. After application of the cover layer in step 304, the multilayered arrangement is fired in step 306. In another exemplary embodiment of the subject technology, the multilayered arrangement is fired in step 308 before application of a cover layer. After firing in step 308, a cover layer may be printed on in step 310 using polymer, glass, or other suitable material.

Once a fired multilayered arrangement is formed in accordance with steps 300, 302 and either 304-306 or 308-310, peripheral terminations may be formed on the device in step 312. At least one respective first and second peripheral termination may be formed on selected side surfaces of the multilayered arrangement to connect exposed portions of the electrode layers and the first and second transition layer electrode portions. In some embodiments, peripheral terminations are formed by printing on thick-film termination material, as previously mentioned. In other embodiments, peripheral terminations (as well as via terminations formed in the cover layer openings in step 314) may be formed by plating technologies. One specific example of such a plating process involves submersing the electronic device(s) in an electroless plating solution until a sufficient amount of plating material is deposited at the exposed conductive portions to form either via terminations in the cover layer windows and/or bridged connections among exposed electrode and adjacent transition layer electrode portions along a device periphery. Alternative plating processes for use with the subject technology have already been discussed. It should be appreciated that step 314 of forming via terminations may in some embodiments correspond to the formation of multi-layered via terminations, such as previously described as potentially including combinations of different metallic and/or resistive materials. A final exemplary step 316 in the process illustrated in FIG. 10 is to apply solder balls to the via terminations formed in step 314.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed:

1. A multilayer electronic device, comprising:
    a plurality of dielectric layers;
    a plurality of electrode layers interleaved with selected of said plurality of dielectric layers to form a multilayered arrangement, said multilayered arrangement defined by first and second opposing surfaces and a plurality of side surfaces, wherein each said electrode layer extends to at least one side surface of said multilayered arrangement;
    at least one respective first and second transition layer electrode portion provided on the first surface of said multilayered arrangement;
    a cover layer provided over said at least one respective first and second transition layer electrode portions, said cover layer formed to define a plurality of openings therethrough for exposing a portion of said at least one respective first and second transition layer electrode portions, wherein said cover layer comprises one of polymer and glass;
    at least one first peripheral termination formed along selected side surfaces of said multilayered arrangement and electrically connecting selected of said electrode layers and said at least one first transition layer electrode portion; and
    at least one second peripheral termination formed along selected side surfaces of said multilayered arrangement and electrically connecting selected of said electrode layers and said at least one second transition layer electrode portion.

2. A multilayer electronic device as in claim 1, wherein:
    said plurality of electrode layers and said at least one respective first and second transition layer electrode portions respectively include a plurality of electrode tabs extending to selected side surfaces of said multilayered arrangement;
    wherein said at least one first peripheral termination electrically connects selected electrode tabs from the at least one first transition layer electrode portion and selected of the electrode layers; and
    wherein said at least one second peripheral termination electrically connects selected electrode tabs from the at least one second transition layer electrode portion and selected of the electrode layers.

3. A multilayer electronic device as in claim 2, further comprising a plurality of via terminations formed in the openings defined by said cover layer.

4. A multilayer electronic device as in claim 3, wherein selected of said via terminations are directly connected to electrode tabs of said at least one respective first and second transition layer electrode portions.

5. A multilayer electronic device as in claim 1, wherein said at least one respective first and second transition layer electrode portions are generally U-shaped or rectangular-shaped.

6. A multilayer electronic device as in claim 1, wherein multiple of said plurality of dielectric layers are provided on the second surface of said multilayered arrangement.

7. A multilayer electronic device as in claim 1, further comprising a plurality of via terminations formed in the openings defined by said cover layer.

8. A multilayer electronic device as in claim 7, further comprising a plurality of solder balls connected to selected of the plurality of via terminations.

9. A multilayer electronic device as in claim 7, wherein said plurality of via terminations comprise a first layer of metallic material, a second layer of resistor-polymeric material, and a third layer of metallic material.

10. A multilayer electronic device as in claim 7, wherein said plurality of via terminations comprise multiple layers of different metallic materials, wherein selected of said multiple layers are formed by electroless plating.

11. A multilayer electronic device as in claim 5, wherein selected of said plurality of via terminations, said at least one first peripheral termination and said at least one second peripheral termination are directly plated to exposed electrode portions.

12. A multilayer electronic device as in claim 1, wherein selected of said electrode layers and said at least one respective first and second transition layer electrode portions comprise ruthenium oxide such that the multilayer electronic device is characterized by a predetermined amount of equivalent series resistance.

13. A multilayer electronic device as in claim 1, wherein said at least one first and second peripheral terminations extend along a substantially entire dimension of a respective selected side surface of the multilayer electronic device and wrap around to at least one side surface adjacent to said respective selected side surface.

14. A multilayer electronic device as in claim 1, further comprising:
    at least one additional respective first and second transition layer electrode portion provided on the second surface of said multilayered arrangement; and
    an additional cover layer provided over said at least one additional respective first and second transition layer electrode portion, said additional cover layer formed to define a plurality of openings therethrough for exposing a portion of said at least one additional respective first and second transition layer electrode portions;
    wherein said at least one first peripheral termination electrically connects selected of said electrode layers, said at least one first transition layer electrode portion provided on the first surface of said multilayered arrangement, and said at least one additional first transition layer electrode portion provided on the second surface of said multilayered arrangement; and
    wherein said at least one second peripheral termination electrically connects selected of said electrode layers, said at least one second transition layer electrode portion provided on the first surface of said multilayered arrangement, and said at least one additional second transition layer electrode portion provided on the second surface of said multilayered arrangement.

15. A multilayer electronic device as in claim 14, further comprising a plurality of via terminations formed in the openings defined by said cover layer and in the openings defined by said additional cover layer.

16. A multilayer electronic device as in claim 15, further comprising a plurality of solder balls connected to selected of the plurality of via terminations.

17. A multilayer electronic device as in claim 14, wherein said cover layer and said additional cover layer comprise one of polymer and glass.

* * * * *

UNITED STATES PATENT AND TRADEMARK OFFICE
CERTIFICATE OF CORRECTION

| | | |
|---|---|---|
| PATENT NO. | : 7,573,698 B2 | Page 1 of 1 |
| APPLICATION NO. | : 11/517536 | |
| DATED | : August 11, 2009 | |
| INVENTOR(S) | : Eggerding et al. | |

It is certified that error appears in the above-identified patent and that said Letters Patent is hereby corrected as shown below:

On the Title Page, Item (57) IN THE ABSTRACT:

Please delete the Abstract and insert therefor:

--A method of forming a window via capacitor comprises a first step of providing a plurality of interleaved dielectric layers and paired electrode layers to create a multilayered arrangement characterized by top and bottom surfaces and a plurality of side surfaces. First and second transition layer electrode portions are provided on a top surface of the multilayered arrangement on top of which a cover layer formed to define openings, or window, therein is provided. The cover layer may be provided before device firing or may be printed on after firing using polymer or glass. Peripheral terminations are subsequently formed on the device periphery to connect selected electrode layers to respective transition layer electrode portions. Via terminations are formed in the cover layer openings, on top of which solder balls may be applied. Some of the terminations may be formed in accordance with various plating techniques as disclosed.--

Signed and Sealed this

Twenty-third Day of March, 2010

David J. Kappos
*Director of the United States Patent and Trademark Office*